Feb. 6, 1968  D. E. GRISWOLD  3,367,621
DIAPHRAGM OPERATED VALVE INCLUDING AN ADJUSTABLE CHOKE PASSAGE
Original Filed Feb. 12, 1964  3 Sheets-Sheet 1
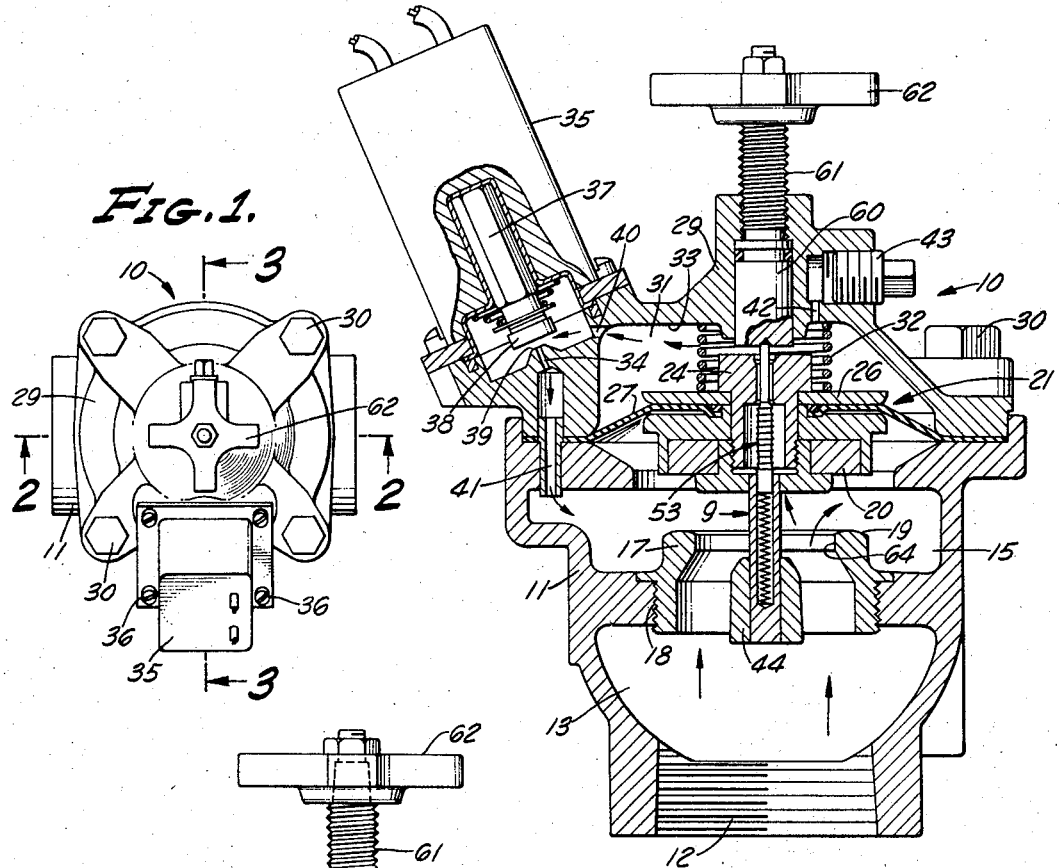
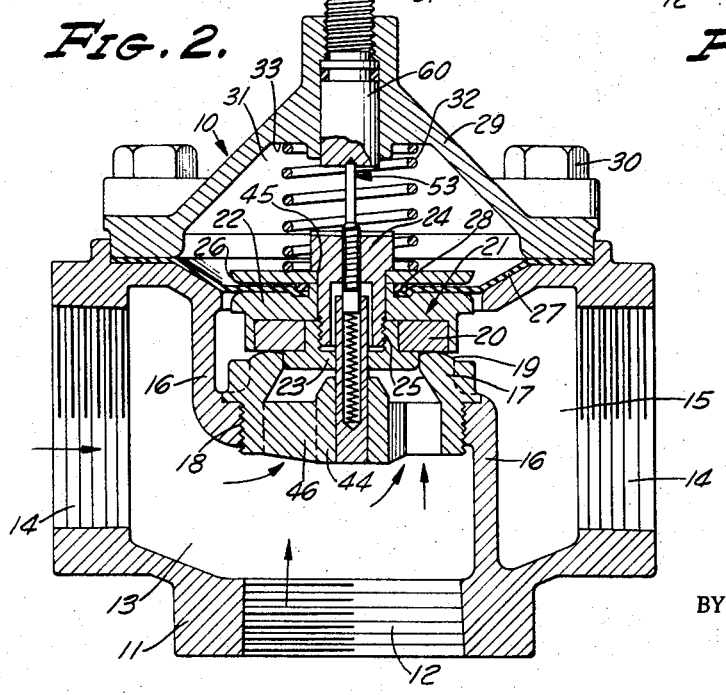
INVENTOR.
DAVID E. GRISWOLD
BY Lyon & Lyon
ATTORNEYS INVENTOR.
DAVID E. GRISWOLD
BY
Lyon & Lyon
ATTORNEYS

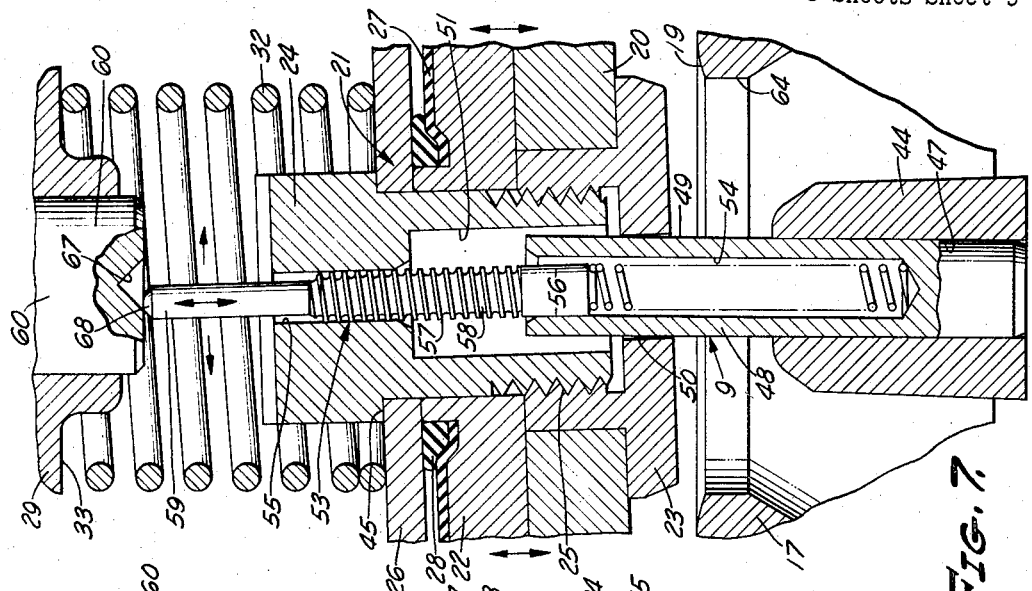

United States Patent Office 3,367,621
Patented Feb. 6, 1968

3,367,621
DIAPHRAGM OPERATED VALVE INCLUDING AN ADJUSTABLE CHOKE PASSAGE
David E. Griswold, Costa Mesa, Calif., assignor to Griswold Controls, Santa Ana, Calif., a corporation of California
Continuation of application Ser. No. 344,448, Feb. 12, 1964. This application Nov. 10, 1966, Ser. No. 593,590
32 Claims. (Cl. 251—35)

This application is a continuation of Ser. No. 344,448, Feb. 12, 1964, now abandoned.

This invention relates to pressure-actuated valves and finds particular usefulness in a control valve system wherein fluid supplied to the inlet of a main control valve is employed in a pilot control system to cause the main valve to open or to close, or to maintain a partly open position.

More specifically, this invention is concerned with a "bleed-type" control system wherein a small portion of the fluid which normally passes through the main control valve is directed from the valve inlet through a strainer device and then through a restricted passageway to a diaphragm chamber for actuating the main valve closure member, and finally through a pilot control valve by way of a vent port from the chamber. The vent port has substantially more capacity than the restricted passageway, and therefore when the pilot control valve is open the actuating chamber is vented to a low-pressure area, and the main valve opens. When the pilot valve is closed, the actuating chamber is subjected to main valve inlet pressure to the restricted passageway, and the main valve closes. If the pilot valve is of the modulating type and responds to the effect of flow through the main valve, the main valve can be made to modulate in relation to the modulation of the pilot valve.

Pressure-actuated valves of the prior art employ a primary restriction in the passage leading from the valve inlet to the valve-control chamber, and the restriction is made small enough to achieve slow-speed movement of the valve closure in order to eliminate water hammer and objectionable surge pressures. However, the restriction passageway is then of such a small size as to render it very susceptible to clogging by small dirt particles suspended in the fluid passing through the valve. To prevent such clogging prior-art devices of this type employ strainers to remove the dirt particles, and, to be effective, the restrainer element must not pass dirt particles of a size larger than will pass through the restricted passageway. Thus, if the strainer openings are smaller than the primary restriction openings, the strainer is most susceptible to clogging. If the strainer openings are larger, particles will pass through and tend to accumulate and clog the opening into the primary restriction.

The principal object of this invention is to provide a pressure-actuated valve that is capable of operating at very slow rates to eliminate water hammer and objectionable surges, and which valve also has a very high dirt-handling capability.

Another object of this invention is to provide a control valve of this type wherein the functioning elements and action of the main valve parts provide both an effective strainer element that is self-cleaning in its action, as well as a primary restriction which is also self-cleaning in its action. The primary restriction is capable of passing larger dirt particles in relation to its fluid-flow capacity than is possible with conventional orifice, needle-valve, or pin-type primary restrictions.

Other and more detailed objects and advantages will appear hereinafter.

In the drawings:

FIGURE 1 is a top plan view showing a preferred embodiment of this invention.

FIGURE 2 is a sectional side elevation, taken substantially on lines 2—2 as shown in FIGURE 1, the valve parts being shown in closed position.

FIGURE 3 is a sectional elevation, taken substantially on the lines 3—3 as shown in FIGURE 1, the valve parts being shown in open position.

FIGURE 7 is a sectional view similar to FIGURE 4, showing the effect of angular misalignment of the valve closure and valve seat, the parts being in open position.

FIGURE 8 is a sectional detail on an enlarged scale, showing constructional details of the metering pin and illustrating the flow of fluid and dirt particles through the continuous helical groove on the pin.

FIGURE 9 is a sectional enlargement similar to FIGURE 8, the parts being in fully open position.

Figure 4:
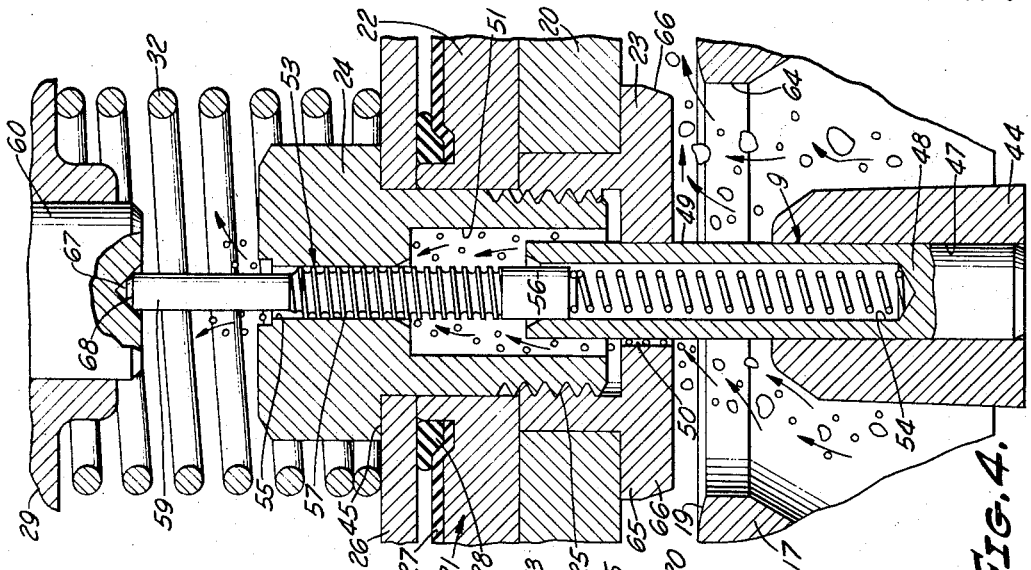
FIGURE 4 is a fragmentary and sectional view, showing a portion of FIGURE 3 on an enlarged scale.

Referring to the drawings, the main control valve is generally designated 10. It comprises a valve body 11, which is a combination globe or angle pattern having a pair of openings 12 leading to an inlet chamber 13. An outlet opening 14 communicates with the outlet chamber 15 within the valve body 11. A stationary divider wall 16 separates the inlet chamber 13 from the outlet chamber 15, and a stationary valve-seat member 17 is fixed on this wall 16 by means of threads 18.

The valve-seat member 17 has an annular horizontal valve-seat surface 19, adapted to be contacted by a sealing disk 20 carried on the movable closure member generally designated 21. This member 21 includes the disk retainer 22 and the disk guide 23, which co-operate to hold the annular sealing disk 20 in position. A sleeve 24 is connected by threads 25 to the disk guide 23. The sleeve 24 has a shoulder 45, which engages the exposed face of the follower plate 26.

The inner periphery of the flexible diaphragm 27 is clamped by means of O-ring 28 between the follower plate 26 and the disk retainer 22. The outer periphery of the diaphragm 27 is clamped between the lower portion of the body 11 and the upper portion, or cover, 29. Threaded fastenings 30 hold these two body portions in assembled relationship.

From this description it will be understood that when the valve parts are in closed position, as shown in FIGURE 2, the sealing disk 20 rests on the horizontal valve-seat surface 19 to prevent flow from the inlet chamber 13 to the outlet chamber 15. When the valve parts are in open position, as shown in FIGURE 3, the movable closure member 21 is spaced above the valve-seat surface 19 so that flow may take place in the direction of the arrows from the inlet chamber 13 to the outlet chamber 15. The diaphragm 27 serves to close the valve when the pressure in the actuating chamber 31 is equal to or greater that the pressure in the valve-inlet chamber 13. The valve spring 32 is a coil-compression spring having one end engaging a shoulder 33 within the cover 29 and the other end engaging the exposed surface of the follower plate 26. The valve spring 32 is provided to (a) assure closure of the disk 20 against the seat surface 19 by overcoming any friction of the parts against movement particularly when the valve assembly is inclined, (b) by offsetting the weight of closure member 21 when inverted, and (c)

under a condition such as static flow when the pressure in the actuating chamber 31 is just equal to the pressure in the inlet chamber 13.

The two-way pilot control solenoid valve 35 is mounted on the cover 29 by means of threaded fastenings 36. The movable armature 37 carries a valve head 38 adapted to close against a seat 39 to prevent flow through the vent port 40 from the chamber 31. When the pilot valve is open, flow of fluid from the actuating chamber 31 passes through the vent port 40 and through the discharge tube 41 into the outlet chamber 15. Flow through a second vent port 42 in the cover 29 is prevented by the plug 43. Removal of this plug serves to open the main valve.

The seat member 17 is provided with a central boss 44 supported on radial ribs 46. This boss has a central axial bore 47. An axial shaft member 9 includes a hollow stem 48 and a pin 53. The hollow stem 48 is fixed in the bore 47 and projects upward above the valve-seat surface 19. The outer cylindrical surface 49 of the stem 48 is slidably received within the central cylindrical opening 50 within the disk guide 23. In FIGURE 4, the radial clearance between the surfaces 49 and 50 is illustrated as occurring only on one side of the stem 48, in order to illustrate the maximum size of dirt particles which can pass through this radial clearance space. The upper end of the stem 48 projects into a cavity 51, formed within the lower portion of the clamping sleeve 24. The cylindrical opening 50 serves as a guide for the vertically movable closure member 21 in moving vertically toward and away from the seat surface 19. The radial clearance space between the surfaces 49 and 50 is small and serves to limit the size of dirt particles which can pass with the fluid into the cavity 51.

The metering pin 53 is mounted to slide within the vertical bore 54 of the stem 49, and this pin extends through a vertical bore 55 in the upper portion of the clamping sleeve 24. The pin 53 has a lower cylindrical portion 56, a restrictor portion 57 provided with a helical groove 58 (best shown in FIGURE 8), and a cylindrical end portion 59. The restrictor portion 57 has a relatively close sliding fit within the bore 55, but the cylindrical portion 59 is of smaller diameter and has considerable clearance within the bore 55, as shown in FIGURE 9.

The central opening 50, cavity 51, and bore 55 cooperate to form a supply passage extending through the movable closure member 21. The primary restriction to flow through the passage and into the actuating chamber 31 is imposed by the restrictor portion 57 of the metering pin 53, sliding within the bore 55. When the cylindrical portion 59 of the pin 53 is positioned within the bore 55, as shown in FIGURE 9, the restriction effect is minimized, and maximum flow takes place into the chamber 31. This flow is greater than the capacity of the vent passage including the pilot valve port 34, and the result is that the increase in pressure in the chamber 31 causes the movable closure member 21 to move downward toward the valve seat 17. This action, in turn, causes the upper portion of the restrictor 57 to be received in the lower end of the bore 55, thereby restricting the rate of flow through the bore 55. When the flow into the chamber 31 through the bore 55 equals the flow outward through the vent passage including the solenoid valve port 34, the movable closure member 21 reaches a "hydraulic stop" and floats in open pressure-balanced position.

The change in restriction effect as a greater portion of the length of the part 57 enters within the bore 55 during closing movement of the main valve (the solenoid valve port 34 being closed) serves to cause the rate of closing of the main valve to diminish as the disk 20 approaches the seat 19. This is an advantageous feature because it minimizes undesirable surges and water hammer. The same effect is achieved by changes in effective diameter over the length of the pin 53 to provide optimum closing speed characteristics.

The extent of the valve opening to reach the "hydraulic stop" position may be regulated by means of the adjustable part 60, mounted on the cover 29. The lower end of this part 60 enters the actuating chamber 31 and contacts the upper end of the metering pin 53. Interengaging threads 61 on the adjustable part 60 and body cover 29 cause the part 60 to move axially when the handle 62 is manually rotated. Regardless of the hydraulic stop position of the movable closure member 21, as controlled by the adjustable part 60, a beneficial action occurs to flush out dirt particles which might otherwise collect at the entrance to the bore 55. This flushing action occurs with each opening of the closure member by reason of fluctuations in line pressure. This action has a further beneficial effect in providing a complete hydraulic support for the flexible diaphragm 27 in the valve open position, as it serves to hold the diaphragm in suspension hydraulically, rather than allowing it to come to rest against a mechanical stop.

The part 60 may be moved toward the seat 19 to a position such as shown in FIGURE 9 wherein the pin 53 is fully depressed into the stem 48 against the action of the spring 52, thereby achieving minimum resistance to flow through the bore 55. Opening of the solenoid valve port 34 then allows a minimum rate of flow from the inlet 12 to the outlet 14, the main valve disk 20 remaining seated. Any flow rate from this minimum up to the maximum capacity may be achieved by adjustment of the part 60.

The vent port 42, shown in FIGURE 3, has a capacity approximately equal to the solenoid valve port 34. By removing the plug 43 and venting the passage including this port 42 to atmosphere or to some other low-pressure area, the main valve is opened. However, the valve travel is limited, and the diaphragm 27 is hydraulically supported by means of the same "hydraulic stop" that functions when the valve is opened through the solenoid valve port 34.

FIGURES 4 through 9 illustrate the construction, function, and dirt-handling capability of the strainer and primary restriction. The radial clearance between the bore 50 and outer cylindrical surface 49 of the stem 48 constitutes the strainer. The primary restriction is formed by the action of the restrictor portion 57 of the metering pin 53 sliding within the bore 55. The U-shaped helical groove configuration of the restrictor portion 57 provides the maximum particle size passageway for the minimum groove cross-section area. In addition, the relatively straight walls of the groove are most effective in providing high resistance to axial flow by means of the alternating series of sharply defining enlargements and contractions of the pin diameter. Velocity flow is also utilized to minimize the passage of dirt particles into the chamber 31 and pilot-control system. Thus, FIGURE 4 shows that the flow into the strainer element 49, 50 is taken at the entrance point where the maximum velocity of the main valve flow occurs. The velocity of flow through the main valve is many times as great as the velocity of flow through the radial clearance between the surface 49 and the opening 50. This difference in velocity helps to minimize the tendency of dirt particles to pass into the control system.

Figure 5:
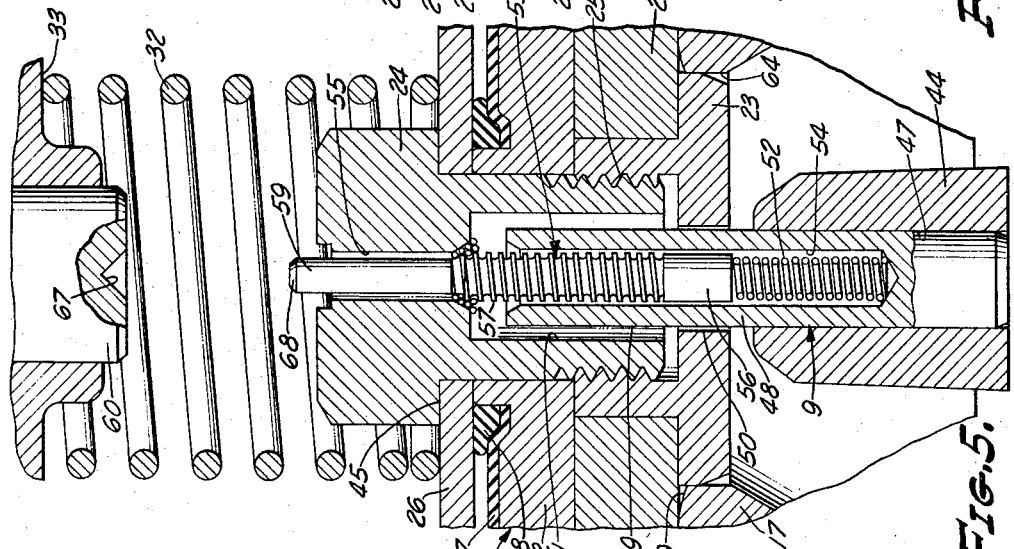
FIGURE 5 is a sectional view similar to FIGURE 4, showing the valve parts in closed position and showing the metering pin held in retracted position by an accumulation of dirt particles.
Figure 6:
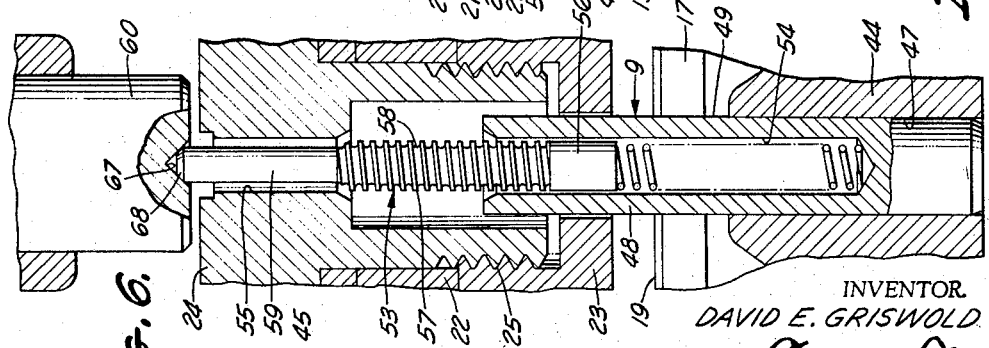
FIGURE 6 is a sectional view similar to FIGURE 5, showing the metering pin held in partially retracted position by means of the adjustable stop on the valve body.

FIGURE 5 illustrates an additional provision for the dirt-handling capabilities of the control system. This provision is effective in the event that any particles or deposits prevent the entrance of the full diameter of pin 53 into the bore 55 at a time when the main valve is required to close, and such a mechanical interference would tend to prevent the movable valve closure 21 from moving toward the valve seat 17. Under these conditions, the upper end of the pin 53 would be moved away from the adjustable part 60 and into the bore 54 to compress the spring 52, thereby allowing the movable valve closure to move to fully closed position. With the next opening of the main valve, the pin 53 would be returned to the position shown in FIGURE 6, and the foreign particles would be flushed through the pilot control system, allowing the pin 53 to return to the position shown in FIGURE 4 and permitting the valve to close in the normal manner. The force of the spring 52 is very small in relation to the force of valve spring 32.

FIGURES 4 and 5 illustrate how the guiding of the movable closure member 21 is accomplished by employing stem 48 and opening 50 as a guide to permit maximum clearance and freedom of movement in the noncritical portion of the valve lift, and yet which allows the outside configuration of the disk guide 23 in conjunction with the cylindrical bore 64 of valve seat 17 to guide the closure member 21 accurately through the final, most critical region of valve opening and closing. An important feature is that this is accomplished with the utilization of only a single, effective bearing relationship 49, 50. The cylindrical outer surface 65 of the disk guide 23 has a very close sliding fit with the inner cylindrical surface 64 of the seat 17. This tighter bearing relationship serves a dual purpose in that during the initial opening or final closing stage, the main valve flow is restricted to the capacity of this same clearance on diameter. The maximum pressure differentials involved with the valve in the nearly closed position, and the resulting high-velocity flow rates, are controlled by this small radial clearance, rather than by the clearance between the valve seat surface 19 and the sealing disk 20. This is of significant value in that high-pressure differentials and resulting high-velocity flow rates between the seat surface 19 and disk 20 tend to produce high-frequency vibration and chatter. Another advantage of this tighter disk-guide-to-seat-bore relationship is that the taper surface 66 on the disk guide 23 merging with the cylindrical surface 65 provides the optimum characteristic of reduction in valve capacity as the movable closure member approaches fully closed position. This optimum rate of capacity change minimizes surge pressures during valve-closing movement. Also, the tapered configuration serves to pilot the disk guide 23 into the bore 64 of the seat 17 and establish the tighter bearing relationship.

Since in water and other corrosive-fluid service, foreign matter may be deposited on the exposed surfaces, and since the tighter the bearing fit, the more susceptible the working parts are to failure because of suspended or deposited foreign matter, it is significant that this tighter bearing fit is only employed at the point of high-velocity flow where the surfaces are continually subjected to the washing action of main-valve flow and where these same bearing surfaces tend to be continually scraped clean by the vertical movement of the disk guide 23 in relation to the seat 17. It will also be noted that the taper surface 66 of the disk guide is also scraped clean over the surface that pilots the disk guide into the closer concentric alignment with the seat 17 than is provided by the looser fit of the stem 49 within the opening 50. This construction also has the advantage that the maximum pressure differentials and corresponding valve-actuating forces are available to assure the movement of disk guide 23 in either opening or closing direction because the tighter fit of the disk guide within the seat 17 is only in effect when the main valve is near fully closed position.

FIGURE 7 shows that the movable closure member 21 is free to tilt slightly when in open position and while hydraulically suspended and is subject to continual movement occasioned by flow turbulence. This movement between the surfaces 49 and 50 serves to scrape the stem 48 free of foreign deposits. Moreover, the lateral movement is effective to produce longitudinal movement of the pin 53 because of the tapered surfaces 67 and 68, and the effect of the continual lateral and longitudinal movement is to promote movement of dirt particles and prevent them from plugging small passages.

Having fully described my invention, it is to be understood that I am not to be limited to the details herein set forth, but that my invention is of the full scope of the appended claims.

I claim:
1. In a pressure-actuated valve having an axially movable closure member co-operable with a stationary valve seat, the combination of: an axial stem fixed centrally to the valve seat and projecting axially therefrom, an element on the movable closure member having a central opening slidably receiving said stem, a pin extending axially from said stem, a second element on said closure member and having an axial bore slidably receiving said pin, said axial bore being smaller than said central opening, the clearance space between the stem and said first element and between the pin and said second element providing a restricted passage extending through the closure member.

2. The combination as claimed in claim 1 wherein said pin is carried by said stem.

3. In a pressure-actuated valve having an axially movable closure member co-operable with a horizontal stationary valve seat, the combination of: an axial stem fixed centrally to the valve seat and projecting axially therefrom, a first element on the movable closure member having a central opening slidably receiving said stem, a pin extending axially from said stem, a second element on said closure member and having an axial bore slidably receiving said pin, the clearance space between the stem and said first element and between the pin and said second element providing a passage extending through the closure member, the radial clearance between the stem and the first element forming, at the entrance of said passage, a screening restriction which offers a resistance to flow therethrough, the radial clearance between the pin and the second element forming a primary restriction in said passage which offers a greater resistance to flow than the screening restriction.

4. In a pressure-actuated valve having a vertically movable closure member co-operable with a horizontal stationary valve seat, the combination of: a vertical stem fixed centrally to the valve seat and projecting axially therefrom, a first element fixed on the movable closure member having a central vertical opening slidably receiving said stem, a vertical pin extending axially from said stem, a second element fixed on said closure member and having an axial bore slidably receiving said pin, the pin having a restrictor portion received within the axial bore when the closure member is in engagement with the valve seat, the pin having a cylindrical end portion of smaller diameter than the restrictor portion received within said axial bore when the closure member is spaced away from the valve seat, the clearance space between the stem and central opening remaining constant during movement of the closure member, and the clearance space between the stem and said first element and between the pin and said second element providing a passage extending through the closure member, the clearance space within the central opening in the first element constituting the entrance to said passage.

5. In a pressure-actuated valve having a vertically movable closure member co-operable with a horizontal stationary valve seat, the combination of: a vertical stem fixed centrally to the valve seat and projecting axially therefrom, a first element fixed on the movable closure member having a central vertical opening slidably receiving said stem, a vertical pin extending axially from said stem, a second element fixed on said closure member and having an axial bore slidably receiving said pin, the pin having a restrictor portion received within the axial bore when the closure member is in engagement with the valve seat, the pin having a cylindrical end portion of smaller diameter than the restrictor portion received within said axial bore when the closure member is spaced away from the valve seat, and the clearance space between the stem and said first element and between the pin and said second element providing a passage extending through the closure member, the radial clearance between the stem and the first element being relatively small to minimize entry of foreign matter and constituting the entrance to said passage and the reception of the restrictor portion of the pin within the axial bore providing greater resistance to flow through said passage.

6. In a pressure-actuated valve having an axially movable closure member co-operable with a stationary valve seat, the combination of: means on the movable closure member providing a central passage extending therethrough and including an axial bore, a pin extending axially into said passage, said pin having a restrictor portion provided with an external helical groove U-shaped in cross-section, the pin also having a cylindrical end portion of smaller outside diameter than said restrictor portion, the axial bore slidably receiving the restrictor portion of said pin when the closure member engages the valve seat, and the axial bore on the closure member receiving the cylindrical end portion of the pin upon movement of the closure member away from said valve seat.

7. In a pressure-actuated valve having an axially movable closure member co-operable with a stationary valve seat, the combination of: an axial stem fixed centrally to the valve seat and projecting axially therefrom, an element fixed on the movable closure member having a central opening slidably receiving said stem, a pin extending axially from said stem, said pin having a restrictor portion provided with an external helical groove U-shaped in cross-section, the pin also having a cylindrical end portion of smaller outside diameter than said restrictor portion, a second element on said closure member and having an axial bore slidably receiving the restrictor portion of said pin when the closure member engages the valve seat, the axial bore on the closure member receiving the cylindrical end portion of the pin upon movement of the closure member away from said valve seat, the clearance space between the stem and said first element and between the pin and said second element providing a restricted passage extending through the closure member.

8. In a pressure-actuated valve having an axially movable closure member co-operable with a stationary valve seat, the combination of: an axial stem fixed centrally to the valve seat and projecting axially therefrom, an element fixed on the movable closure member having a central opening slidably receiving said stem, a pin extending axially from said stem, said pin having a restrictor portion provided with an external helical groove U-shaped in cross-section, a second element on said closure member and having an axial bore slidably receiving the restrictor portion of said pin when the closure member engages the valve seat, the axial bore on the closure member receiving the cylindrical end portion of the pin upon movement of the closure member away from said valve seat, the clearance space between the stem and said first element and between the pin and said second element providing a restricted passage extending through the closure member, the radial clearance between the stem and the first element being relatively small to minimize entry of foreign matter into said passage, and the reception of the restrictor portion of the pin within the axial bore providing greater resistance to flow through said passage.

9. In a pressure-actuated valve having an axially movable closure member co-operable with a stationary valve seat, the combination of: an axial stem fixed centrally to the valve seat and projecting axially therefrom, an element fixed on the movable closure member having a central opening slidably receiving said stem, a pin extending axially from said stem, said pin having a restrictor portion provided with an external helical groove U-shaped in cross-section, the pin also having a cylindrical end portion of smaller outside diameter than said restrictor portion, a second element on said closure member and having an axial bore slidably receiving the restrictor portion of said pin when the closure member engages the valve seat, the axial bore on the closure member receiving the cylindrical end portion of the pin upon movement of the closure member away from said valve seat, the clearance space between the stem and said first element and between the pin and said second element providing a restricted passage extending through the closure member, the radial clearance between the stem and the first element being relatively small to minimize entry of foreign matter into said passage, the reception of the restrictor portion of the pin within the axial bore providing greater resistance to flow through said passage, and the reception of the cylindrical portion of the pin within the axial bore providing lesser resistance to flow through said passage.

10. In a pressure-actuated valve having a body with a fixed valve seat, a movable closure member co-operable with the valve seat, and having means whereby the closure member forms a chamber within the body, the improvement comprising, in combination: means including an element cooperating with the movable closure member providing a supply passage extending into the chamber, said means being proportioned so that the capacity of said supply passage increases abruptly upon movement of the closure member away from the valve seat beyond a certain position, the supply passage serving to admit pressure into said chamber and thereby move the closure member toward engagement with said valve seat, a vent passage communicating with the chamber, said vent passage having a restriction of smaller capacity than the maximum capacity of said supply passage, and means for moving said element to change the location of said certain position, whereby fluid pressure moves the closure member with respect to the valve seat to float in said certain position.

11. In a pressure-actuated valve having a body with a fixed horizontal valve seat, a vertically movable closure member co-operable with the valve seat, and means whereby the closure member forms a chamber within the body, the improvement comprising, in combination: means on the movable closure member providing a central vertical opening extending therethrough, a vertical pin extending into said central opening, means supporting said pin, the dimensions of the pin and the opening being such that the clearance space between the pin and said central opening increases abruptly upon vertical movement of the closure member away from the valve seat, the supply passage provided by said clearance space serving to admit pressure fluid into said chamber and thereby move the closure member vertically into engagement with said valve seat, a vent passage communicating with the chamber, said vent passage having a restriction of smaller capacity than the maximum capacity of said supply passage, and means for moving said pin axially to permit fluid pressure to move the closure member vertically to float in a pressure-balanced position.

12. In a pressure-actuated valve having a body with a fixed valve seat, a movable closure member co-operable with the valve seat, and a diaphragm having its periphery fixed to the body and its central portion fixed to the closure member to form a chamber within the body, the improvement comprising, in combination: means fixed on the movable closure member providing a supply passage extending therethrough, the passage including a central opening and an axial bore, an axial stem fixed to the valve seat and extending into the central opening, an axial pin carried on the stem and extending into said axial bore, the dimensions of the pin and the bore being such that the clearance space between the pin and said central opening increases abruptly upon movement of the closure member away from the valve seat, said supply passage serving to admit pressure fluid into said chamber and thereby move the closure member into engagement with said valve seat, a vent passage communicating with the diaphragm chamber and having a restriction of smaller capacity than the maximum capacity of said supply passage, and means for moving said pin axially on said stem to permit fluid pressure to move the closure member to float in a pressure-balanced position.

13. In a pressure-actuated valve having a body with a fixed valve seat, a movable closure member co-operable with the valve seat, and means whereby the closure member forms a chamber within the body, the improvement comprising, in combination: a tubular stem fixed centrally to the valve seat and extending axially thereof, an element fixed on the movable closure member having a central opening slidably receiving said stem for guiding the movement of the closure member toward and away from said valve seat, an axially movable pin slidably mounted within a central opening in said tubular stem, a second element fixed on said closure member and having an axial bore slidably receiving said pin, the clearance space between the stem and said first element and between the pin and said second element providing a restricted passage communicating with the chamber, said restricted passage serving to admit pressure fluid into said chamber and thereby move the closure member toward engagement with said valve seat, resilient means urging said pin axially, adjustable means on the body for limiting axial movement of said pin, and means for venting the chamber to permit fluid pressure to move the closure member away from the valve seat.

14. In a pressure-actuated valve having a body with a fixed valve seat, a movable closure member co-operable with the valve seat, and means whereby the closure member forms a chamber within the body, the improvement comprising, in combination: a tubular stem fixed centrally to the valve seat and extending axially thereof, an element fixed on the movable closure member having a central opening slidably receiving said stem for guiding the movement of the closure member toward and away from said valve seat, an axially movable pin slidably mounted within a central opening in said tubular stem, a second element fixed on said closure member and having an axial bore slidably receiving said pin, the clearance space between the stem and said first element and between the pin and said second element providing a restricted passage communicating with the chamber, said restricted passage serving to admit pressure fluid into said chamber and thereby move the closure member into engagement with said valve seat, resilient means within said stem urging said pin axially, an adjustable threaded stop on the body for limiting axial movement of said pin, and means for venting the chamber to permit fluid pressure to move the closure member away from the valve seat.

15. In a pressure-actuated valve having a body with a fixed valve seat, a movable closure member co-operable with the valve seat, and means whereby the closure member forms a chamber within the body, the improvement comprising, in combination: a stem fixed centrally to the valve seat and extending axially thereof, an element fixed on the movable closure member having a central opening slidably receiving said stem for guiding the movement of the closure member toward and away from said valve seat, said element and said stem being exposed to the velocity of moving fluid when the closure member is spaced away from the valve seat, an axially extending pin mounted on said stem, a second element fixed on said closure member and having an axial bore slidably receiving said pin, the central opening being larger than the axial bore, the clearance space between the stem and said first element and between the pin and said second element providing a passage communicating with the chamber, said passage serving to admit pressure fluid into said chamber and thereby move the closure member toward engagement with said valve seat, and means for venting the chamber to permit fluid pressure to move the closure member away from the valve seat.

16. In a pressure-actuated valve, the combination of: a stationary valve seat member having a seat face and having a cylindrical bore, an axially movable closure member having a disk engageable with said valve seat face, said closure member having a guide element engaging the disk and having an outer cylindrical surface slidable within said cylindrical bore in the valve seat member, said closure member and guide element being movable between a closed position in which the guide element extends into said cylindrical bore and an open position in which the guide element is axially spaced from the seat face, said guide element also having a central axial opening positioned radially within said outer cylindrical surface and without axial spacing with respect thereto, an axial stem fixed centrally to the valve seat member and slidably received in said opening, the stem extending beyond the valve seat face, the radial clearance between the stem and said opening being greater than the radial clearance between the outer cylindrical surface of the disk guide and the cylindrical bore of the valve seat, when the disk engages said valve seat face.

17. In a pressure-actuated valve, the combination of: a stationary valve seat member having a horizontal seat face and having a vertical cylindrical bore, a vertically movable closure member having a disk engageable with said valve seat face, said closure member having a guide element engaging the disk and having an outer cylindrical surface slidable within said cylindrical bore in the valve seat member, said guide element having a taper surface remote from the disk and merging with said outer cylindrical surface, said closure member and guide element being movable between a closed position in which the guide element extends into said cylindrical bore and an open position in which the guide element is axially spaced from the seat face, said guide element also having a central vertical opening positioned radially within said outer cylindrical surface and without axial spacing with respect thereto, an axial stem fixed centrally to the valve seat member and slidably received in said opening, the stem extending vertically beyond the valve seat face, the radial clearance between the stem and said opening being greater than the radial clearance between the outer cylindrical surface of the disk guide and the cylindrical bore of the valve seat, when the disk engages said valve seat face, and the guide element having a lower face extending from said opening to said taper surface.

18. In a pressure-actuated valve, the combination of: a stationary valve seat member having a seat face and having a cylindrical bore, an axially movable closure member having a disk engageable with said valve seat face, said closure member having a guide element engaging the disk and having an outer cylindrical surface slidable within said cylindrical bore in the valve seat member, said guide element having a taper surface remote from the disk and merging with said outer cylindrical surface, said closure member and guide element being movable between a closed position in which the guide element extends into said cylindrical bore and an open position in which the guide element is axially spaced from the seat face, said guide element also having a central axial opening positioned radially within said outer cylindrical surface and without axial spacing with respect thereto, an axial stem fixed centrally to the valve seat member and slidably received in said opening, the stem extending beyond the valve seat face, the radial clearance between the stem and said opening being greater than the radial clearance between the outer cylindrical surface of the disk guide and the cylindrical bore of the valve seat, when the disk engages said valve seat face, and the guide element having a radial face extending from said opening to said taper surface.

19. In a pressure-actuated valve having an axially movable closure member co-operable with a stationary valve seat, the combination of: an axial fixed shaft member projecting centrally of the valve seat, the closure member having an element provided with a central opening slidably receiving and guided by said shaft member, the clearance space between the shaft member and said element constituting a strainer passage, means on the closure member constituting a primary restriction, said clearance space and said primary restriction forming at least a part of a passage extending through the closure member, the cross-sectional area of said strainer passage being greater than that of said primary restriction, but the maximum lateral dimension of said strainer passage being smaller than that of said primary restriction so that foreign matter passing through said strainer passage may also pass through said primary restriction.

20. In a pressure-actuated valve having an axially movable closure member co-operable with a stationary valve seat, the combination of: an axial fixed shaft member projecting centrally of the valve seat, the closure member having a first element provided with a central opening slidably receiving and guided by said shaft member and also having a second element provided with an axial bore slidably receiving said shaft member, the clearance space between the shaft member and the first element constituting a strainer passage, the clearance space between the shaft member and the second element constituting a primary restriction, said clearance spaces forming at least a part of a passage extending through the closure member, the cross-sectional area of said strainer passage being greater than that of said primary restriction, but the maximum lateral dimension of said strainer passage being smaller than that of said primary restriction so that foreign matter passing through said strainer passage may also pass through said primary restriction.

21. In a pressure-actuated valve having an axially movable closure member co-operable with a stationary valve seat, the combination of: an axial fixed shaft member projecting centrally of the valve seat and comprising a stem and a pin mounted on the stem, the closure member having a first element provided with a central opening slidably receiving and guided by said stem and also having a second element provided with an axial bore slidably receiving said pin, the clearance space between the stem and the first element constituting a strainer passage, the clearance space between the pin and the second element constituting a primary restriction, said clearance spaces forming at least a part of a passage extending through the closure member, the cross-sectional area of said strainer passage being greater than that of said primary restriction, but the maximum lateral dimension of said strainer passage being smaller than that of said primary restriction so that foreign matter passing through said strainer passage may also pass through said primary restriction.

22. In a pressure-actuated valve having an axially movable closure member co-operable with a stationary valve seat, the combination of: a stem and a pin mounted on the stem projecting centrally of the valve seat, the closure member having a first element provided with a central opening slidably receiving and guided by said stem and also having a second element provided with an axial bore slidably receiving said pin, the clearance space between the stem and the first element constituting a strainer passage, the clearance space between the pin and the second element being defined by walls constituting a primary restriction, one of said walls having a helical groove, said clearance spaces forming at least a part of a passage extending through the closure member, the cross-sectional area of said strainer passage being greater than that of said primary restriction, but the maximum lateral dimension of said strainer passage being smaller than that of the helical groove of said primary restriction so that foreign matter passing through said strainer passage may also pass through said primary restriction.

23. In a pressure-actuated valve having an expansible pressure chamber and an axially movable closure member co-operable with a stationary valve seat, the combination of: an axial pin projecting centrally of the valve seat, the closure member having an element provided with an axial bore slidably receiving said pin, the clearance space between the pin and said element constituting a restriction to flow into said chamber, the pin and the bore being constructed so that the degree of restriction decreases as the closure member moves axially away from the valve seat, a vent passage communicating with the chamber and having a restriction of smaller capacity than the maximum capacity of flow through said clearance space, movable means for opening the vent passage, and means for changing the axial position of the pin for controlling the movement of the closure member away from the valve seat.

24. In a pressure-actuated valve having an axially movable closure member co-operable with a stationary valve seat, the combination of: means on the movable closure member providing a central passage extending therethrough and including an axial bore, a pin extending axially into said passage, said pin having a restrictor portion with a grooved external surface, the pin also having a cylindrical end portion of smaller outside diameter than said restrictor portion, the axial bore slidably receiving the restrictor portion of said pin when the closure member engages the valve seat, and the axial bore on the closure member receiving the cylindrical end portion of the pin upon movement of the closure member away from said valve seat.

25. In a pressure-actuated valve having an axially movable closure member co-operable with a stationary valve seat, the combination of: means on the movable closure member providing a central passage extending therethrough and including an axial bore, a pin extending axially into said passage, said pin having a restrictor portion provided with an external helical groove, the pin also having a cylindrical end portion of small outside diameter than said restrictor portion, the axial bore slidably receiving the restrictor portion of said pin when the closure member engages the valve seat, and the axial bore on the closure member receiving the cylindrical end portion of the pin upon movement of the closure member away from said valve seat.

26. In a pressure-actuated valve having a body with a fixed valve seat, a movable closure member co-operable with the valve seat, and means whereby the closure member forms a chamber within the body, the improvement comprising, in combination: means including an element co-operating with the movable closure member and the valve seat providing a supply passage extending into the chamber, said means being so proportioned that the capacity of said supply passage increases significantly upon axial movement of said member away from said seat beyond a certain position, the supply passage serving to admit pressure fluid into said chamber and thereby move the closure member toward engagement with said valve seat, a vent passage communicating with the chamber, said vent passage having a restriction of smaller capacity than the maximum capacity of said supply passage whereby the closure member may move away from the valve seat beyond said certain position to float in a pressure-balanced position, and means for varying the location of said pressure-balanced position with respect to said valve seat, said varying means comprising means for varying the position of said element.

27. The combination set forth in claim 26 in which the said element comprises an axial pin, and wherein said varying means includes an element engageable with said axial pin.

28. In a pressure-actuated valve having an expansible pressure chamber and an axially movable closure member co-operable with a stationary valve seat, the improvement comprising, in combination: an axial pin projecting centrally of the valve seat, a second element on said closure member having an axial bore slidably receiving said pin, the clearance space between the pin and said axial bore providing a supply passage extending through the closure member, the pin and the bore being constructed so that the capacity of said supply passage increases significantly as the closure member moves axially beyond a certain distance away from the valve seat, said supply passage serving to admit pressure fluid into said chamber and thereby move the closure member into engagement with said valve seat, a vent passage communicating with the chamber, said vent passage having a smaller flow capacity than the maximum capacity of said supply passage whereby the closure member may move away from the valve seat beyond said certain position to float in a pressure-balanced position, and means for controlling the extent of movement of the closure member away from the valve seat, said controlling means comprising means for changing the axial position of said pin.

29. In a pressure-actuated valve having an expansible pressure chamber and an axially movable closure member co-operable with a stationary valve seat, the improvement comprising, in combination: an axially movable stop, an axially movable pin engageable with said stop, resilient means urging said pin to move into engagement with said stop in a direction opposite to closing movement of said member, said closure member having an element provided with an axial bore slidably receiving said pin, the bore forming at least a part of a passage extending through the closure member, said passage serving to admit pressure fluid into said chamber and thereby move the closure member toward engagement with said valve seat.

30. In a pressure-actuated valve having an expansible pressure chamber and an axially movable closure member co-operable with a stationary valve seat, the improvement comprising, in combination: an axially movable stop, an axially movable pin engageable with said stop, resilient means urging said pin to move into engagement with said stop in a direction opposite to closing movement of said member, said closure member having an element provided with an axial bore slidably receiving said pin, the dimensions of the pin and the axial bore being such that the clearance space between the pin and said bore decreases upon axial movement of the closure member toward the valve seat, said clearance space forming at least a part of a passage extending through the closure member, said passage serving to admit pressure fluid into said chamber and thereby move the closure member into engagement with said valve seat.

31. In a pressure-actuated valve having an expansible pressure chamber and an axially movable closure member co-operable with a stationary valve seat, the improvement comprising, in combination: an axially movable pin projecting centrally of the valve seat, the closure member having an element provided with an axial bore slidably receiving said pin, the pin and the bore forming part of a supply passage extending through said closure member into said chamber, the radial clearance between the pin and the axial bore forming a primary restriction in said supply passage, the pin having a restrictor portion received within the axial bore when the closure member is in engagement with the valve seat, the supply passage serving to admit pressure fluid into said chamber and thereby move the closure member toward engagement with said valve seat, a stop element, and resilient means urging said pin to move axially into engagement with the stop element in a direction opposite to closing movement of said member toward said seat.

32. The combination set forth in claim 31 in which said pin also has another portion forming a lesser restriction within said axial bore when the closure member is spaced beyond a certain distance away from the valve seat.

References Cited

UNITED STATES PATENTS

| | | | |
|---|---|---|---|
| 1,046,236 | 12/1912 | Wagner | 251—35 |
| 1,614,468 | 1/1927 | Haas | 251—46 X |
| 1,754,138 | 4/1930 | Ager | 138—43 X |
| 1,813,709 | 7/1931 | Pasman | 251—42 |
| 1,851,062 | 3/1932 | Protzer | 251—46 |
| 2,293,143 | 9/1942 | Johnston | 138—42 |
| 2,749,932 | 6/1956 | Mosher | 137—244 |
| 3,076,471 | 2/1963 | Salerno | 251—35 X |

FOREIGN PATENTS

| | | |
|---|---|---|
| 14,055 | 1903 | Great Britain. |
| 358,649 | 1/1962 | Switzerland. |

M. CARY NELSON, *Primary Examiner.*

A. ROSENTHAL, *Assistant Examiner.*